United States Patent

[11] 3,589,806

[72] Inventor Arthur Rak
Altadena, Calif.
[21] Appl. No. 871,393
[22] Filed Sept. 17, 1969
[45] Patented June 29, 1971
[73] Assignee Bell & Howell Company
Chicago, Ill.
Continuation of application Ser. No. 650,855, July 3, 1967, now abandoned.

[54] CONTROL SYSTEM FOR PLURAL MOTION-PICTURE PROJECTORS OPERATING FROM A SINGLE FILM STRIP
14 Claims, 4 Drawing Figs.
[52] U.S. Cl. ................................................. 352/133
[51] Int. Cl. .................................................. G03b 21/00
[50] Field of Search ..................................... 352/14, 133, 159

[56] References Cited
UNITED STATES PATENTS
1,392,475 10/1921 Bingham ..................... 352/70
3,006,240 10/1961 Holler ......................... 352/14
3,025,751 3/1962 Braun ......................... 352/14
3,244,469 4/1966 Hennessey ................... 352/14
3,379,488 4/1968 Lancor ........................ 352/14

Primary Examiner—S. Clement Swisher
Attorney—Christie, Parker & Hale

ABSTRACT: A control system for a plurality of motion-picture projectors operating sequentially on a single strand of film. The system includes a mechanism for forming and monitoring a film loop of a predetermined length at each projection station. As the loop length increases and decreases by a predetermined amount, the system automatically compensates for such changes by interrupting power to one or more of the plurality of projector motors while the remainder of the system attempts to restore itself to normal operation. In the event of a failure of a particular projection station, means are provided for bypassing that station and for disabling portions of the control system to compensate for the missing projector.

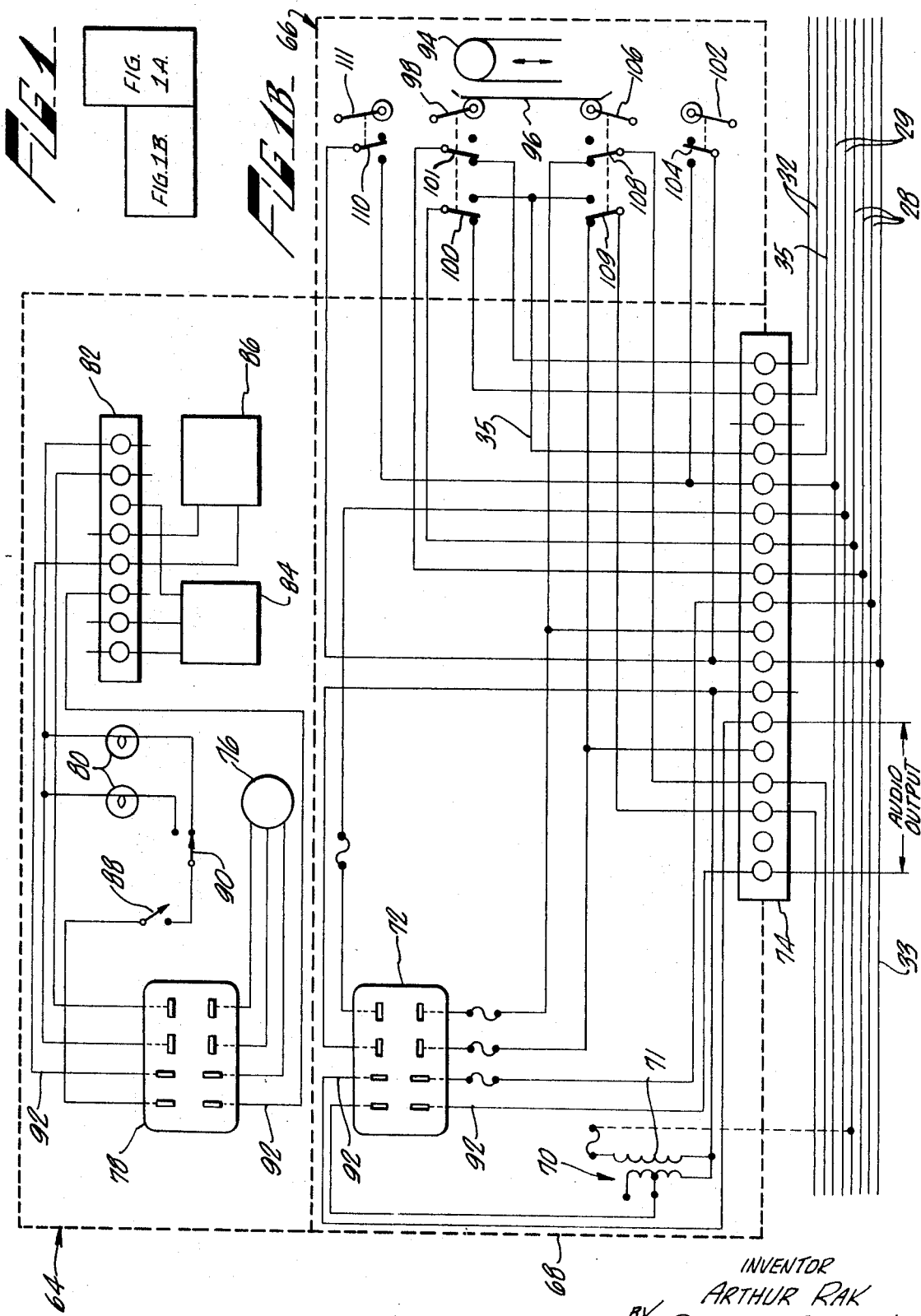

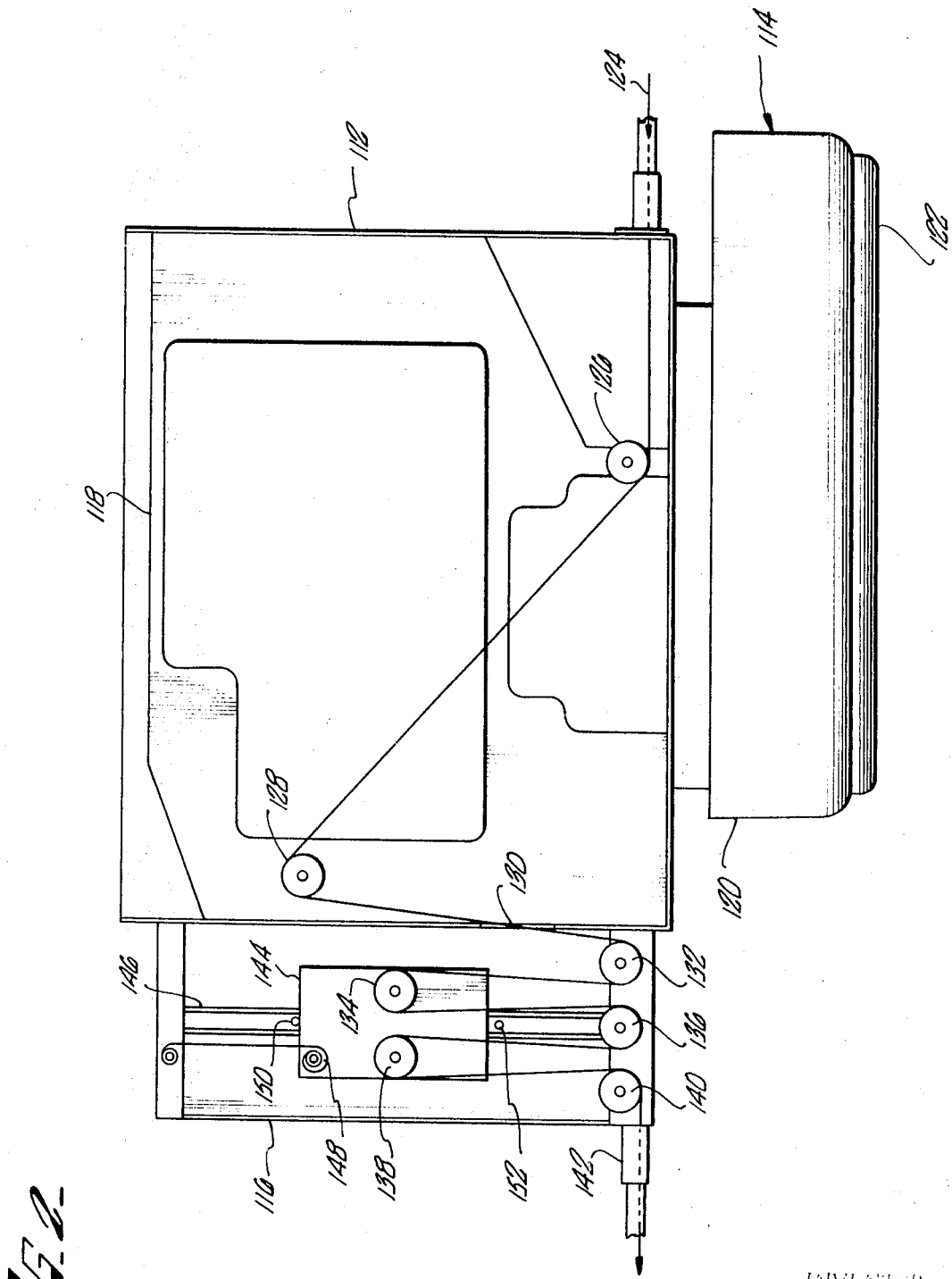

CONTROL SYSTEM FOR PLURAL MOTION-PICTURE PROJECTORS OPERATING FROM A SINGLE FILM STRIP

CROSS-REFERENCE TO RELATED APPLICATION

This application is a continuation of my copending application Ser. No. 650,855, filed July 3, 1967, now abandoned.

BACKGROUND OF THE INVENTION

This invention relates to electromechanical control systems and in particular to a system for controlling the operation of a plurality of motion-picture projectors such as those used in an entertainment system provided for passenger aircraft.

As described in application Ser. No. 485,768, filed Sept. 8, 1965, now U.S. Pat. No. 3,379,488, a previous system for providing the control functions for a motion-picture entertainment system relied on the capability of conventional motion-picture projectors to be switched into a "still" mode, a feature commonly used for viewing a particular frame in a motion-picture film. This feature was provided by means of a mechanical clutch built into the projector which when operated disengaged the drive motor from the projector sprocket drive stopping the film until such time as it was desired to move it again. In utilizing such an arrangement in a system employing a number of motion-picture projectors, the change in the length of a film loop was used to operate solenoids for controlling the engagement of the clutches on associated motion-picture projectors. Such a system required relatively elaborate electrical circuitry including relays and solenoids for accomplishing the engagement and disengagement of mechanical clutches in addition to the provision of the clutches themselves in each projector.

The present invention operates on the principle of interruption of electrical power to the system in order to obtain its control function. The invention provides an apparatus for controlling a plurality of motion-picture projectors arranged in sequential relationship and adapted to pass a strand of motion-picture film serially through each projector. The apparatus comprises a source of electrical power, a station for unreeling film, a station for reeling film, a plurality of drive motors, each of the drive motors being associated with the reeling station and with a different one of the projectors respectively. The drive motors and projectors are connected by electrical circuitry to the source of power and associated with each drive motor are means for dynamically storing a portion of the film strand. First sensing means associated with each film-storing means sense deviations in film loop length from a predetermined value and are operatively engaged with first means for interrupting the electrical connection between the drive motor and the power source when film loop length in the storing means decreases by a first predetermined amount. Second sensing means associated with each projector are also provided for interrupting the electrical connection between the power source and the drive motor associated with the immediately preceding projector when the film loop length increases by a first predetermined amount. First and second limit means are provided in association with each projector for interrupting the electrical connection between the source and the system when film loop length increases or decreases by a second larger predetermined amount.

Such a system is characterized by the elimination of mechanical clutching and associated electrical equipment. In this system when the film loop length at any projection station changes by a first or second predetermined amount, power to one or more of the drive motors is temporarily or permanently interrupted. In the first instance when the length increases or decreases by a first predetermined amount, the power to an individual drive motor is interrupted allowing the system time to restore itself to normal operation. If the system fails to restore itself to normal operations within a predetermined amount of time, a time delay relay operates interrupting power to the entire system and shutting it down. Maintenance personnel can then examine the system and provide corrections. When film loop length changes by a second larger predetermined amount, i.e., where film has broken at some point in the system, limit switches associated with one or more of the drive motors are operated immediately interrupting power to the system.

BRIEF DESCRIPTION OF THE DRAWING

These and other features of the system will be more readily understood by reference to the following figures in which:

FIG. 1 illustrates the relationship of the schematic diagrams of FIGS. 1A and 1B;

FIG. 1B is a schematic diagram of the electrical circuitry of a typical projector station in the system; and FIG. 2 is a diagram of a projector station illustrating the film looping arrangement and a mechanical insert for bypassing a disabled projector station.

DESCRIPTION OF THE PREFERRED EMBODIMENT

Figure 1A:
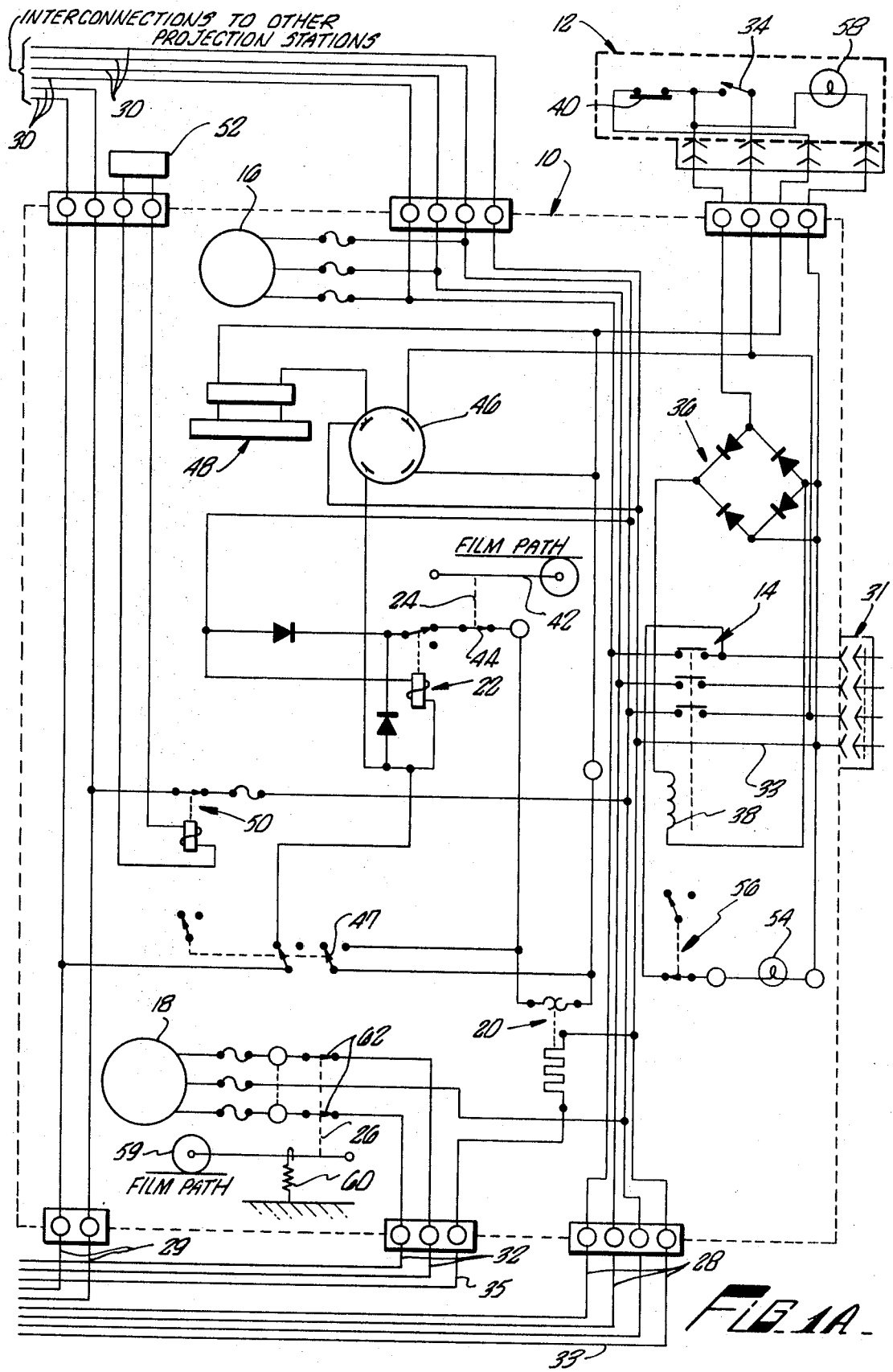
FIG. 1A is a schematic diagram of the control system provided in conjunction with a film reeling and unreeling station.

Referring now to FIG. 1A, there is shown therein a projector system control 10 including a control box assembly 12, a main power contactor 14, a drive motor 16, a metering motor 18, a time delay relay 20, a limit relay 22, an end of film switch 24, and a film tension switch 26. The system control is connected by means of leads 28, 29, 30, 32, 33 and 35 to the projectors in the system. Typically half of the projectors are wired in parallel over leads 30 and the remaining half are wired in parallel over leads 28, 29, 32, 33 and 35. The system control is typically housed in a module which also houses the film supply and takeup reels and will be described herein as used in such an embodiment. The system of the present invention is also readily adaptable to use with an arrangement wherein the supply and takeup reels are placed at locations remote from one another.

In operation the system control is connected to a 400-cycle, three-phase, source of AC power by means of connector 31. Lead 33 is a common or ground lead provided with the system. Once the system control is connected to the source of power and the various projector stations are connected to the system control, a start switch 34 is actuated closing a circuit through a rectifier bridge circuit 36 to a main power contactor coil 38 causing a power contactor 14 to operate. The closing of power contactor 14 supplies power to the various elements of the system control as well as the projectors in the system. Once the main power contactor is operated, start switch 34, which is spring loaded, returns to its normally open position. When it is desired to shut off the system, switch 40 is operated opening the circuit to the power contactor relay coil causing the power contactor 14 to release.

In addition to manually controlling the continuity of the circuit supplying power to contactor relay coil 38, several additional control elements, namely, time delay relay 20, limit relay 22, and end of film switch 24, are also connected in the circuit supplying power to coil 38. Upon the occurrence of predetermined conditions (as will be discussed in more detail below), operation of any one of the preceding control elements interrupts the electric circuit from the source of input power through bridge 36 to the coil. The operation of time delay relay 20 and limit relay 22 will be considered in conjunction with the mechanism for controlling the operation of the individual projection stations.

The end of film switch 24 utilizes a spring-loaded mechanical contactor 42 which engages the film between its edges. When contactor 42 encounters a discontinuity in the film, either in the form of a hole or a break in the film, contactor 42 rotates upwardly operating switch 44 and opens the electric circuit which connects one of the three-phase leads through coil 38 to system ground, thereby causing contactor 14 to release, shutting the system down.

Drive motor 16 supplies the mechanical power for turning film supply and takeup reels and is connected to the source of power for the system through the main power contactor 14.

Certain auxiliary control elements are provided with the system control. These include a socket 46 for permitting remote operation of the system. This feature is utilized in conjunction with a limit relay defeating switch 47. Remote operation is accomplished by operating the limit defeat switch 47 to its alternate position thereby bypassing the limit relay 22 and the time delay relay 20. By plugging an extension cord into socket 46 and providing an on-off control at the end of the cord, a technician can thread film through and service the projector system without interference from the automatic control features provided by the aforementioned relays. When servicing is completed and a film is engaged in the system the remote control cord is disconnected and the limit defeat switch operated to the position shown in FIG. 1A to permit the fully automatic operation of the system.

An elapsed time meter 48 is provided for measuring the number of hours that the system has been operated between servicing of the system. A pilot intercom relay 50 is provided for interrupting the power supplied to the audio amplifiers in each projection station to permit interruption of the audio portion of the film presentation during pilot announcements. The relay is operated in response to the controls in a pilot intercommunication system 52. A service lamp 54 and switch for operating lamp 56 are provided for illuminating the supply and takeup reel module during servicing. A second service lamp 58 is also provided to give a visual indication of the operating condition of the main power contactor.

The metering motor 18 is provided in conjunction with the takeup reel for operating a sprocket which engages film entering the supply and takeup module from the last projector in the system. During normal operation of the system the metering motor 18 feeds film from the last projector station to the takeup reel at a predetermined rate to obtain proper recovery and winding of the film on the takeup reel. When the film moving past a spring-biased film contactor 59 decreases in tension, contactor 59 is drawn downward by a spring 60 opening contacts 62 in leads 32 which supply power to the metering motor.

As is discussed in more detail in copending application, Ser. No. 621,375, filed Jan. 6, 1967, now U.S. Pat. No. 3,398,914, the electrical control associated with metering motor 18 operates in conjunction with a mechanical braking system associated with the supply and takeup reels. As film tension at contactor 59 decreases, the film sprocket and metering motor are stopped while the takeup reel continues to rotate thereby increasing film tension at contactor 59. When tension has increased to a predetermined point, contacts 62 close and metering motor 18 again begins to operate. An increase in film tension between contactor 59 and the takeup reel causes the reel to slip or freewheel until the film tension has been reduced to the desired value. Increasing film tension between the metering motor and the projector assembly in the display station immediately preceding the supply and takeup module is sensed by the film control looping mechanism associated with that display station opening the power circuit to the station drive motor and stopping the motor until such time as film tension has been reduced a predetermined amount to allow it to resume operation. The operations of each display station insofar as the preceding aspect of system operation is concerned and the other functions of the film control mechanism associated with each projector station will be discussed in conjunction with FIG. 1B.

Referring to FIG. 1B, the schematic is divided into three sections or assemblies, a projector and amplifier assembly 64, a film looper control assembly 66 and a projector pan assembly 68. The schematic diagram shown in FIG. 1B is illustrative of the electrical wiring at each of the projector stations in the system. Each projection station in the system includes a mounting receptacle, referred to as a projector pan assembly, adapted to receive motion-picture projector and audio amplifier assemblies. Mounted at the side of the projector pan assembly is a film looper control assembly. The mechanical aspects of the projector pan assembly are described in more detail in U.S. Pat. application, Ser. No. 613,155, filed Feb. 1, 1967, now U.S. Pat. No. 3,454,167.

As shown in FIG. 1B, the projector pan assembly 68 is provided with a lamp transformer 70, an electrical receptacle 72 and a terminal strip 74. The projector and amplifier assembly 64 includes a drive motor 76, an electrical plug 78 adapted to mate with receptacle 72, a pair of projector lamps 80, an amplifier 82, a preamplifier 84, and an exciter lamp assembly 86. An inertially operated switch 88 is provided for opening and closing the circuit energizing the projector lamps 80. Switch 88 is mechanically linked to the rotation of drive motor 76 and is shown in its open position. When the drive motor is turning inertia causes switch 88 to close energizing one of the two projector lamps depending upon the position of switch 90. When the drive motor stops, switch 88 automatically opens, deenergizing the projector lamp and preventing burning of the film strip positioned directly in line with the lamp.

In operation the projector assembly 64 is placed in the projector pan assembly 68 and plug 78 engaged with socket 72 to supply electrical power to the drive motor 76, amplifier 82, preamplifier 84 and exciter lamp assembly 86. When power is supplied to the entire system via connector 30 and start switch 34 is operated, each projector is energized and film is withdrawn from the supply reel and driven through the various projectors in the system to the takeup reel. As long as the system operates normally, each of the drive motors 76 continues to drive film through its associated projector and looping mechanism. As film passes through each projector, it is subjected to light from the projection lamp which is then projected through a shutter and suitable lens arrangement to the exterior of the camera and finally to a front- or back-lighted motion-picture projection screen. In its travel through the projector the film also passes between an exciter lamp and a photoelectric pickup to pick up the audio portion of the presentation. The sound track on the film is detected by the exciter-pickup combination, amplified in the preamplifier 84 and amplifier 82, and transmitted via leads 92 to audio transducers such as earphones, speakers and the like.

To prevent disablement of a projector due to lamp burnout, two projection lamps 80 are provided. If one of the projection lamps burns out, switch 90 is operated to connect the alternate lamp to the source of power to enable continued operation of the projector with which the lamp is associated. A lamp transformer 70 is provided for stepping down the voltage from the 400-cycle system supply to a voltage suitable for energization of the projection lamps. One side of primary winding 71 is connected to common lead 33. The other side of primary 71 is connected to one of the three leads 28 from the three-phase input. The lamp transformer at each station is connected to a different one of the three-phase leads than the preceding and succeeding transformers in order to balance the load on the supply.

The operation of the film-looping control assembly 66 is as follows: When film tension tends to increase, i.e., as the film loop length tends to decrease, spring-loaded roller 94 is drawn downwardly causing shoe 96 to move in the same direction. Upon moving a predetermined distance toggle switch 98 is operated, opening contacts 100 and 101, causing time delay relay 20 in the system control to begin operation and interrupting the power circuit to the motor in the succeeding state of the system. Where the next succeeding stage is the supply and takeup module, power to metering motor 18 is interrupted by the opening of contact 101. If the shoe and roller are not restored to their normal position, thereby reoperating toggle switch 98 within a predetermined time, e.g., 10 seconds, the time delay relay opens, interrupting the power circuit and disconnecting power from the system. It is presumed that if the system is unable to restore itself to normal operation within a relatively short amount of time, system operation should be interrupted to eliminate the possibility of more serious malfunction.

If film tension on looper 94 continues to increase, e.g., due to a projector becoming jammed and unable to feed film, shoe 96 descends to a point where it contacts toggle switch 102, also referred to as the lower limit switch. Operation of toggle switch 102 causes contact 104 to operate, which in turn causes energization of limit relay 22 in the system control. Operation of relay 22 opens the circuit to the main power contactor and disconnects power from the system. In this manner the system can react more rapidly to the occurrence of a malfunction without waiting for operation of the time delay relay.

In the same manner, if film tension tends to decrease, i.e., the film loop length tends to increase, the roller or film looper rises, moving shoe 96 with it. When the shoe has moved upwardly a predetermined amount, toggle 106 is operated, opening contacts 108 and 109. The operation of contact 109 has the effect of energizing time delay relay 20 through the contact 101 in the projection station immediately preceding the projector shown in FIG. 1B. The operation of contact 108 has the effect of interrupting the power circuit to drive motor 76 of the projector station in FIG. 1B, thereby stilling that motor until such time as the film loop is restored to its normal position. If film tension continues to decrease, toggle 111 is operated, operating contact 110. As with the operation of contact 104, contact 110 completes the electrical circuit to limit relay 22, thereby causing main power contactor 14 to release disconnecting power from the system.

The schematic of FIG. 1B is representative of the schematic wiring of the various projectors in the system with the exception that lead 35 is wired to the time delay relay. A corresponding lead in the remaining projectors of the system is not wired. The time delay relay is, therefore, only caused to function by operation of contacts 100 and 109 in the electrical circuitry of the last projector. If any of the projectors preceding the last projector experience movement of the control looper, causing toggles corresponding to toggle 98 to operate and a chain reaction is begun causing each succeeding projector to stop until the last projector in the system (i.e., the projector preceding the takeup reel) is stopped, the circuit to the time delay relay is completed and begins its timing sequence.

The mechanical aspects of a typical projection station are shown in FIG. 2. In that figure is shown a projector pan 112, a projection screen assembly 114, and a film looper control assembly 116. Shown located in the pan is a bypass unit 118 which is placed in a projector pan in the event a projector becomes disabled and a station is bypassed. The screen assembly 114 is attached to the projector pan and mounted below it so that when a projector is located in pan 112 the projections from the motion-picture film are directed downwardly into the assembly. Assembly 114 comprises a housing 120 and a projection screen mounting 122 which opens downwardly and outwardly from the screen assembly.

In operation with bypass unit in position, film 124 enters the projection station moving in the direction shown and passes around guide rollers 126 and 128. Film exits from the projector pan assembly through an aperture 130 and traces a looping path around guide rollers 132, 134, 136, 138 and 140 and enters a film guide 142 to traverse the distance between the projection station shown in FIG. 2 and the next succeeding station in the chain. Rollers 132, 136 and 140 are mounted on looping mechanism 116. Rollers 134 and 138 are mounted on a moving block 144 which is adapted to move vertically on track 146. Block 144 is mechanically connected to looper assembly 116 by a Negator self-winding leaf spring 148.

During normal system operation when tension on the film strip is at the desired level, block 144 is drawn downwardly from the top of mechanism 116 and held at an equilibrium position approximately half way between the upper and lower limits of travel as shown in FIG. 2. As block 144 moves vertically, shoe 96 mounted on block 144 operates toggle switches such as those shown in FIG. 1B to produce the control functions described above.

When a bypass unit 118 is placed in a projector pan assembly in place of a projector, certain adjustments of the looper control assembly are necessary in the station in which the bypass unit is located and in the immediately preceding station. This adjustment involves the provision of mechanical stops in track 146 to prevent block 144 from moving either upwardly or downwardly. In the station provided with the bypass, mechanical stop 150 is provided in the track in an aperture located above the normal position of the block when the film looper is in its operating mode. This mechanical stop prevents the block from rising and is provided because there is no control function to be performed at that station. As described previously, an upward movement of the block signals a decrease in film tension normally calling for a control function which temporarily interrupts or disconnects the electric circuit to the drive motor associated with the bypassed station. Since no drive motor is provided, this aspect of the control function is disabled.

Similarly, in the projector station immediately preceding the station provided with the bypass unit, a stop is inserted in an aperture such as aperture 152 shown in FIG. 2. In this case the mechanical stop prevents block 144 from descending below the normal operating position of the block. As indicated in connection with a discussion of FIG. 1B, a downward movement of the film-looping mechanism normally signals an increase in tension which has the function of opening the electrical circuit to the drive motor associated with the projector station in the next succeeding station. Since the next succeeding station is bypassed as shown in FIG. 2, this control is no longer necessary and is disabled. In contrast, the film-looping mechanism in FIG. 2 is permitted to move downwardly since a movement in this direction signals an increase in tension necessitating at least a brief interruption in the operation of the drive motor associated with the projector station following the bypassed station to permit film feeding from the bypassed station to assume normal tension value signalled by the return of the film-looping mechanism to its normal operating position shown in FIG. 2.

The five guide roller configuration of the film-looping assembly shown in FIG. 2 is illustrative of one possible design. Because the system operates on the principle of interrupting the electrical circuit to the drive motors allowing these motors to coast to a stop, a certain amount of inertia is inherent in the system. This inertia means that film continues to be pulled through the system as one or more of the drive motors slow to a halt causing an increase in film tension. By providing that a relatively long length of film is gathered in the looping assembly, a sufficient amount of film is provided to allow this inertial effect to occur without increasing tension on the film to the point where it is susceptible to being broken.

What I claim is:

1. Apparatus for controlling an entertainment system including a plurality of motion-picture projectors arranged in sequential relationship and adapted to pass a strand of motion-picture film serially through each projector comprising:

a source of electrical power;
a station for unreeling film;
a station for reeling film;
a plurality of drive motors, on each of said motors being associated with the reeling stations and with each projector respectively;
means for electrically connecting the source of power to the drive motors and projectors;
means associated with each drive motor for dynamically storing a portion of the film strand;
means associated with each film-storing means for sensing deviations in film length from a predetermined value;
first means associated with each drive motor for interrupting the electrical connection between the drive motor and the power source when film length in the storing means decreases by a first predetermined amount;
second means associated with each projector for interrupting the electrical connection between the power source and the drive motor associated with the immediately preceding projector when film length in the storing means increases by a first predetermined amount;

first limit means associated with each projector for interrupting the electrical connection between the source and the system when film length decreases by a second larger predetermined amount; and second limit means associated with each projector for interrupting the electrical connection between the source and the system when film length increases by a second larger predetermined amount.

2. Apparatus according to claim 1 wherein the film-storing means include a support, a member reciprocally movably mounted on the support, spring means for biasing the movable member to a first position on the support, first film guide means mounted on the movable member, and second film guide means mounted on the support whereby film looped around the first guide means biases the movable member to a second position on the support during operation of the apparatus.

3. Apparatus according to claim 2 wherein the sensing means are four, spaced, mechanical arms positionable in response to movement of the movable member of the film storing means.

4. Apparatus according to claim 3 wherein a mechanical extension is mounted on the movable member for operatively engaging each of said four mechanical arms.

5. Apparatus according to claim 4 wherein said first and second interrupting means are electrical contacts operatively engaged with one of said mechanical arms respectively.

6. Apparatus according to claim 5 wherein said first and second limit means are electrical contacts operatively engaged with one of said mechanical arms respectively.

7. Apparatus according to claim 1 wherein the station for reeling film and the station for unreeling film are combined in a single module.

8. Apparatus according to claim 7 including control means located at the film reeling and unreeling module for connecting electrical power to the system for an external source.

9. Apparatus according to claim 8 wherein the control means includes means for disabling said first and second limit means.

10. Apparatus according to claim 9 including time delay means for interrupting the electrical connection to the system a predetermined amount of time after interruption of the electrical connection to the last projector in the system.

11. Apparatus according to claim 1 including means for bypassing at least one projection station and means for modifying the film-storing means to compensate for the absence of said projection station from the system.

12. Apparatus according to claim 11 wherein said control means includes end of film-sensing means for interrupting the electrical connection to the system after a film presentation has been passed through the plurality of projectors.

13. Apparatus according to claim 11 including means for interrupting the audio portion of the motion picture presentation from a location remote from the system control means.

14. Apparatus according to claim 9 including means for controlling the operation of the projectors and control means from a location remotely located with respect to the system control means.